Figure 3:
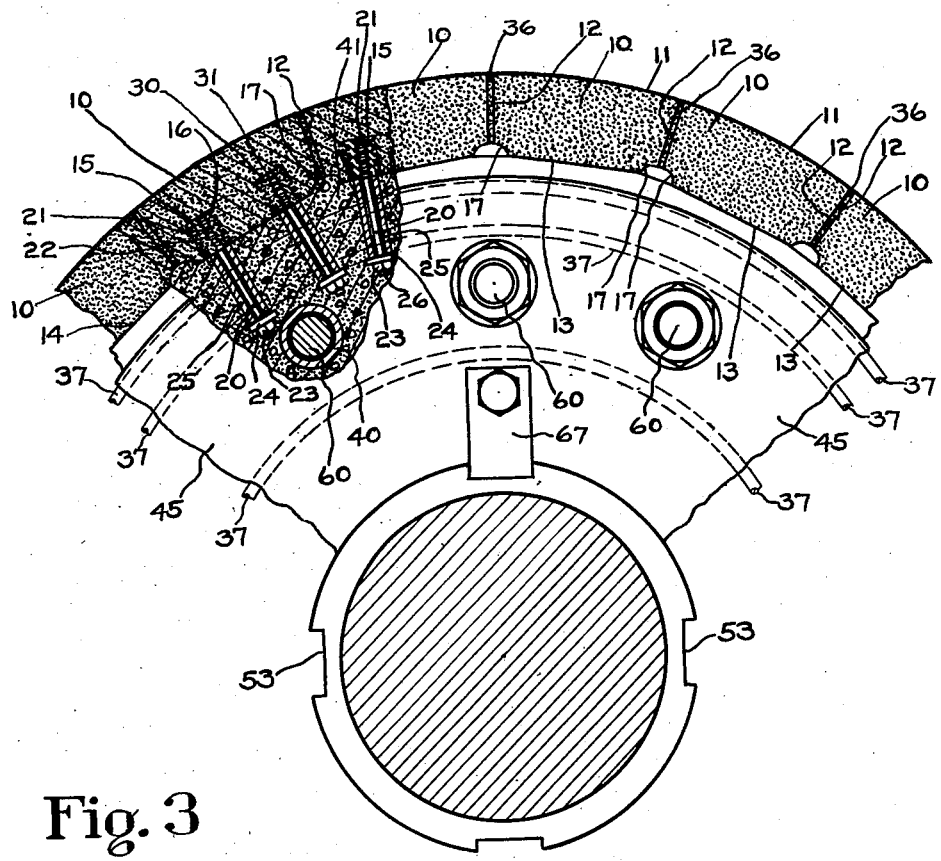

Sept. 28, 1948.   H. W. H. BETH   2,450,227
PULPSTONE
Filed May 18, 1946   2 Sheets-Sheet 1
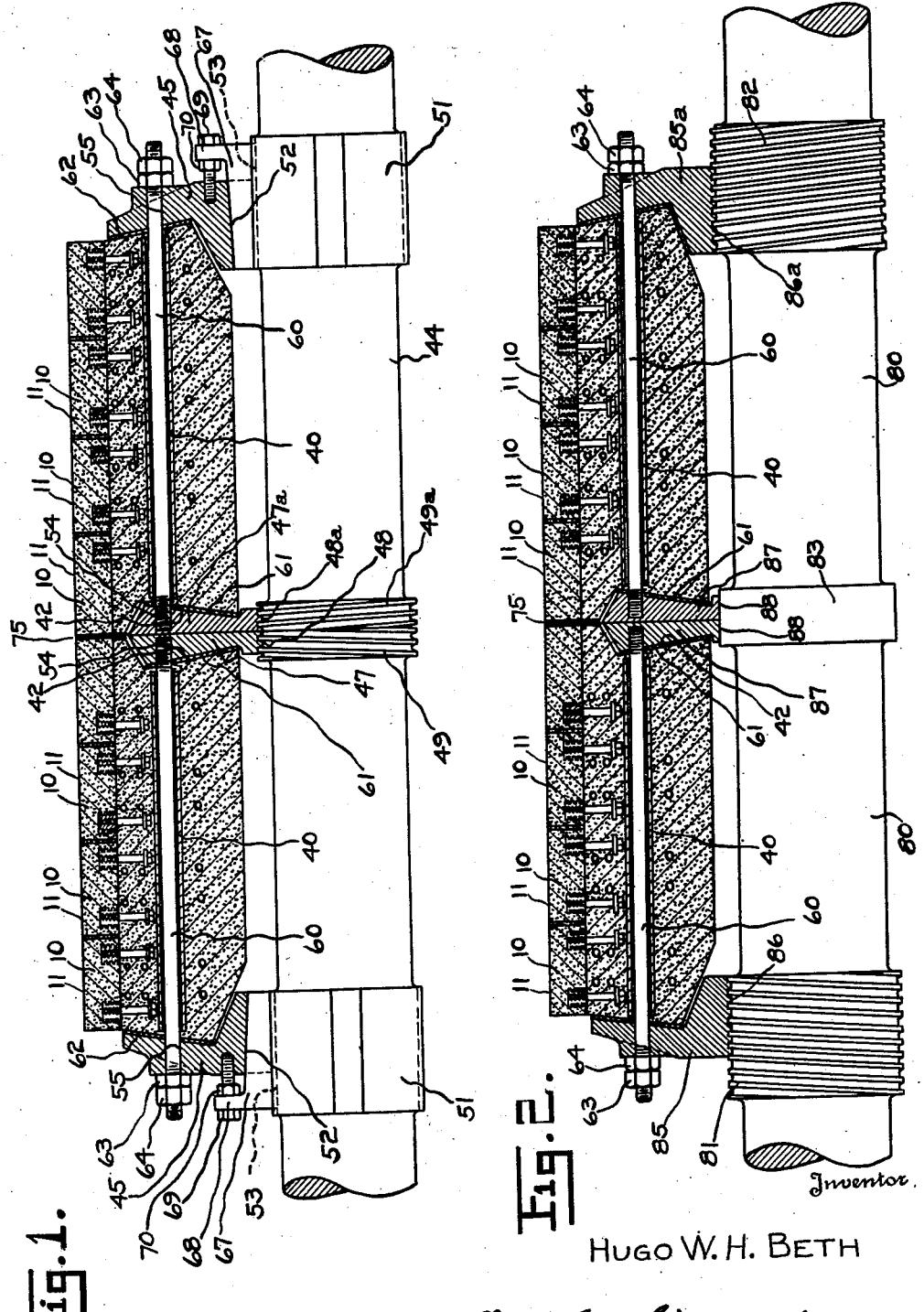
Inventor
Hugo W. H. Beth Sept. 28, 1948. H. W. H. BETH 2,450,227
PULPSTONE
Filed May 18, 1946 2 Sheets-Sheet 2

Inventor
HUGO W.H. BETH

Patented Sept. 28, 1948

2,450,227

UNITED STATES PATENT OFFICE 2,450,227

PULPSTONE

Hugo W. H. Beth, Worcester, Mass., assignor to Norton Company, Worcester, Mass., a corporation of Massachusetts Application May 18, 1946, Serial No. 670,664

5 Claims. (Cl. 51—206.4)

The invention relates to pulpstones, and with regard to its more specific features to pulpstones for grinding long logs.

One object of the invention is to provide a long pulpstone for example of the order of eight feet in length (length here meaning the axial dimension). Another object is to provide a strong pulpstone of considerable length. Another object is to provide a simple and practical pulpstone and mount of a size and weight necessary to grind long logs, and which is capable of long continued and dependable operation. Another object of the invention is to provide a construction for a long pulpstone which is economical to manufacture. Another object is to provide driving means for a pulpstone which is capable of absorbing a greater amount of horsepower than conventional driving means.

Another object of the invention is to provide a long pulpstone capable of being used in high production grinding without developing excessive stresses and pressures at the flanges and upon the concrete center. Another object is to provide a pulpstone which is reinforced axially as well as radially. Other objects will be in part obvious or in part pointed out hereinafter.

The invention accordingly consists in the features of construction, combinations of elements, and arrangements of parts, as will be exemplified in the structure to be hereinafter described, and the scope of the application of which will be indicated in the following claims.

In the accompanying drawings, in which is shown two of many possible embodiments of the mechanical features of this invention, Figure 1 is an axial sectional view of one half of a pulpstone constructed in accordance with the invention, together with the driving flanges and the driving shaft, Figure 2 is an axial sectional view similar to Figure 1 but illustrating another embodiment of the invention, Figure 3 is an end elevation of a portion of the pulpstone of Figure 1, with part thereof shown in cross section, all on a larger scale than Figure 1.

As conducive to a clearer understanding of the present invention, it is noted that pulpstones are customarily driven by flanges on right and left hand threads on the driving shaft, such construction compressing the flanges against the ends of the pulpstone thus providing pressure for frictional driving. The pressure is a function of the power factor as will be readily understood. Pulpstones now used are commonly no more than five feet in axial dimension, usually less. In such stones the power factor is not great enough to set up pressure which could crush the stones.

According to the present invention, however, it is contemplated that stones eight and even nine feet long will be constructed. If flange friction only were used to do the driving, very large pressures would be created. The situation is aggravated, moreover, by the differential expansion of the stone and the steel shaft which in the case of a long standard shaft assumes serious proportions.

I provide a number of blocks 10 of bonded abrasive material. Each block of bonded abrasive material is composed of any desired type of abrasive such as silicon carbide or fused alumina, the latter being preferred, bonded together with a suitable bonding material, vitrified bond being preferred. Each block 10 is, therefore, formed of a mixture of clay or frit with abrasive, suitably plasticized as by the provision of a suitable amount of plastic clay and the addition of water, then molded in a suitable mold and pressed under high pressure to cause the block to have sufficient "green" strength for handling. After each block 10 comes from the mold, it has an outer cylindrical surface 11 bounded by radial surfaces 12, and a flat surface 13 opposite the surface 11. While the block 10 is in a "green" state, I bore four holes 15 therein, each hole 15 having numerous grooves in its side walls. I then form reentrant grooves 17 in the dihedral angles of each block 10 at opposite ends of the surface 13. In the finished stone, each groove 17 is adjacent to a corresponding groove 17 in the adjacent block.

The segments 10 are then fired in a kiln and the material is converted to vitrified bonded abrasive material. I provide a quantity of bolts 20 having heads 21 with grooves. I further provide an equal quantity of nuts 23, washers 24 and sleeves 25. I place the sleeves 25 on the bolts 20 abutting the heads 21. I then place the washers 24 against the ends of the sleeves 25, place the nuts upon the outer threaded ends 26 of the bolts 20 and tighten the nuts 23. Thereby the bolts 20 are placed under initial tension.

I then place in each hole 15 a head 21 of a bolt 20 and fill the space with a suitable self setting cement 30 such as a mixture of Portland cement and iron filings. This has excellent molding power. Each block 10 thus has four bolts 20 projecting therefrom, each bolt being encased by a sleeve 25 and having attached to it a washer 24. Each bolt 20 is under initial tension such that a considerable force is needed to move the head 21 away from the washer 24 by even a very slight distance. Each bolt 20 is securely locked to its block 10 by reason of the fact that the cement 30 interlocks with the grooves in the block 10 and also interlocks with the grooves in the head 21. The foregoing construction will be found illustrated on a larger scale in U. S. Patent #2,141,608.

I now arrange the blocks 10 in rows to form two hollow cylinders of outside diameter equal to that of the finished pulpstone and of axial length of one half that of the finished pulpstone.

Between the blocks I place suitable filler material 36 such as that described in U. S. Patent No. 2,054,771. The blocks are clamped together and the two assemblies are placed in an oven to bake the material 36. Inside these hollow cylinders after they are removed from the oven, I place cages formed of hoops of steel 37 spaced apart axially by metal clips, not shown. This construction is substantially the same as that described in Patent No. 2,141,608 and preferably there are a plurality of cages made of hoops, for example three as shown, the hoops of one cage being of a different diameter from the hoops of another cage. The cages serve to reinforce the stone against centrifugal force and other radial forces.

For the manufacture of each part of the stone I use bottom mold plates and a pair of mold sleeves (not shown). The mold sleeves are placed in the centers of the cylinders of blocks, and they rest upon the bottom mold plates. All of these mold parts are located coaxial with the cylinders of blocks and are suitably braced. As thus far described, except for the greater length of the ultimate pulpstone, and that for the purposes of this invention the pulpstone is poured in two halves divided normal to its axis, the construction and method of construction is the same as that described in Patent No. 2,141,608 referred to, and so far as the present invention is concerned this construction may be varied.

According to the present invention there is additionally provided means for reinforcing the concrete center of the stone in an axial direction. This reinforcement is capable of withstanding compressive forces as well as tensioning and bending forces.

As shown in Figures 1 and 2 (for in many respects the two embodiments are alike) I provide a plurality of heavy pipes 40 and I arrange these inside the mold sleeves parallel to each other and preferably in circles coaxial with the assemblies.

The pipes 40 are placed in position before the concrete is poured. They may be held in place by templates, the bottom mold plate serving as one template in each assembly. The concrete 41 which may consist of a suitable mixture of Portland cement, sand and trap rock, is now poured inside the cylinders of blocks 10 and allowed to set. The surfaces 42 of the upper ends (as the two sections stood when poured) are shaped to a circular hollow shape as shown for a purpose hereinafter explained, before the concrete has set. The molds and clamps are removed, and the two halves of the pulpstone are trued, dressed and sided. The pulpstone per se is now finished. When mounted together end to end upon a drive shaft these two halves will form a continuous cylindrical grinding surface.

The pulpstone may be mounted upon a drive shaft 44. Referring to Figure 1, I provide a pair of heavy end flanges 45 which are identical and a row of similar center flanges 47 and 47a. The center flanges 47 and 47a have axial holes 48 and 48a which have left and right handed threads respectively to fit threaded portions 49 and 49a of the drive shaft 44. The end flanges 45 and 46 are center bored to fit over enlarged bearing surfaces 51 of the drive shaft 44, and have interior keyways 52 superposable upon keyways 53 upon the enlarged bearing surfaces 51 of the drive shaft 44. The center flanges 47 and 47a have a plurality of tapped holes 54 to fit opposite each of the pipe sleeves 40. The end flanges 45 and 46 also have a plurality of holes 55 to fit opposite the sleeves 40.

I provide a great number of shafts 60 having screw threads upon their ends. Placing an annular piece of gasket material 61 between the flange 47 and the surface 42 of one half of the stone, and an annular piece of gasket material 62 between the end of this half of the stone and the flange 45, and aligning the pipes 40 with the tubes 54 and 55 I place shafts 60 through the holes 55 and pipes 40 and screw them into the tapped holes 54. I then place nuts 63 upon the outer threaded ends of the shafts 60, tighten them, and apply lock nuts 64 against the nuts 63. This holds the flanges 45 and 47 firmly against the half of the stone and also provides a positive driving connection between the flanges 45 and the half of the stone. I similarly assembly a flange 45 and a flange 47a with shafts 60 to the other half of the stone. The gasket material 61 and 62 may be plywood or other suitable resilient material.

The driving shaft 44, which is usually the armature shaft of a powerful electric motor is or has been removed from its journals and from the armature of the motor or a driving gear. The two halves of the stone are to be placed upon the drive shaft 44 from opposite ends thereof. Selecting either half of the stone, I slide the flange 47 or 47a over the shaft and bearing 51 so that the threaded hole 48 meets the threaded portion 49 or the threaded hole 48a meets the threaded portion 49a. I then screw the flange 47 or 47a onto the threaded portion 49 or 49a as far as it will go. The above is relative, and it may be easier to insert the shaft 44 into the half stone and turn the shaft. I then back off the stone or shaft, if necessary, until keyways 52 and 53 match.

I provide a plurality (for example eight) of taper keys 67 each having a lug 68. There should be enough for all of the keyway 52 which are also tapered, with the large ends outside. I provide an equal number of bolts 69 and lock nuts 70. The flanges 45 have an equal number of tapped holes 71 which are angularly in the same position as the keyways 52. Four (or one half the total number) keys 67 are now inserted in the matched keyways 52 and 53 and the bolts are screwed into the tapped holes 71 and tightened.

At sometime before the second half of the stone is placed upon the shaft 44 an annular piece of cured or vulcanized material 75 according to Patent No. 2,054,771 is secured to the end of either half of the stone adjacent but outside of the surface 42. This material 75 may be secured in place by means of an air setting cement that will adhere to vulcanized rubber and to concrete. Then the corresponding surface of the other half of the stone is painted with the same cement. Now the second half of the stone is placed upon the shaft 44, screwed into place and secured by keys 67 in the manner above described.

Referring now to Figure 2, the two halves of the stone may be exactly as already described, or they might be different, but the mounting means is different, and this includes the flanges and the shaft. The differences are as follows: The drive shaft 80 has at the left a left handed threaded portion 81 of large dimensions and rather long pitch, and at the right a right handed threaded portion 82 also of large dimensions and rather long pitch. In between the portions 81 and 82 is a cylindrical bearing portion 83 of a diameter greater than either of the threaded portions 81 and 82. Flanges 85 and 85a are similar to the flanges 45, but they have no keyway; instead they have threaded holes, the flange 85 having a threaded hole 86 with a left hand thread fitting the portion 81 and the flange 85a having a threaded hole 86a fitting the portion 82. Inner flanges 87 are alike and also like the flanges 47 and 47a except that their axial holes 88 are not threaded but fit onto the cylindrical bearing part 83.

The assembly of the flanges 85 and 85a is made to the halves of the stone by means of the long shafts 60 as in the case of the embodiment of Figure 1. Then the halves can be placed upon the shaft 80, a flange 87 first being passed over the shaft 80, a flange 87 first being passed over a threaded portion 81 or 82 and finally a flange 85 or 85a being screwed onto the threaded portion 81 or 82 as the flange 87 goes onto the bearing part in 83. In this embodiment the threads 81 and 82 drive the flanges 85 and 85a, and the flanges 85 and 85a drive the stone by means of the shafts 60. In the embodiment of Figure 2 the halves of the stone are tightened that is the halves of the stone are thrust towards each other by the driving of the stone and the friction of grinding, but detrimental forces are not set up because the threads 81 and 82 are of long pitch. These threads 81 and 82 can be of long pitch because tightening of the flanges thereby is not relied on to drive the stone.

In either embodiment of the invention the shafts 60 may hold the flanges 47 and 47a, 87 and 87a onto the stone halves tightly enough to drive them, but the pressure will not be excessive, and if there is slippage the shafts 60 become positive driving members. In the embodiment of the invention the stone and the shaft support each other at the center as well as at the ends. In either embodiment of the invention the stones are reinforced both axially and radially. The problems of manufacturing, handling, shipping and mounting a very long pulpstone are solved by this invention, since the two halves individually are neither excessively long nor excessively heavy. Yet when mounted on shaft they act virtually like a single stone. In the embodiment of Figure 2 the halves of the stone are thrust towards each other during grinding by virtue of the right and left hand threads, but the pressure is more excessive because the pitch of the threaded portions 81 and 82 is long.

It will thus be seen that there has been provided by this invention a pulpstone in which the various objects hereinabove set forth together with many thoroughly practical advantages are successfully achieved. As many possible embodiments may be made of the above invention and as many changes might be made in the embodiments above set forth, it is to be understood that all matter hereinbefore set forth or shown in the accompanying drawings is to be interpreted as illustrative and not in a limiting sense.

I claim:

1. A pulpstone comprising a plurality of blocks of bonded abrasive material arranged to form a hollow cylinder, a hollow concrete center inside said cylinder and supporting it, bolts embedded in said blocks and in said center attaching said blocks to said concrete center, a second plurality of blocks of bonded abrasive material similarly arranged, a second concrete center supporting said second plurality of blocks, bolts embedded in said second plurality of blocks and in said second center attaching said second plurality of blocks to said second center, said centers being dished out annularly, and pipes extending parallel to the axis of said centers and embedded in said concrete, whereby each of the concrete centers can be attached to flanges by bolts through the pipes, one flange of each center being in the dished out annular portion and the other flange of each center being opposite it.

2. A long pulpstone comprising two halves of similar shape and dimensions, each half comprising a hollow concrete center portion and blocks of bonded abrasive material and bolts embedded in center portion and in said blocks securing said blocks of bonded abrasive material to the outside of said center portion, and one end of each center portion being cut back to provide space for a center flange without causing a break in the abrasive surface of said blocks, the blocks of one half being close to the blocks of the other half, and pipes through said center portions longitudinal thereof to receive members attaching said center portions to the flanges in the cut backs.

3. A long pulpstone in two halves each comprising a plurality of blocks of bonded abrasive material arranged in the form of a hollow cylinder, the diameter of the cylinder of one half being the same as the diameter of the cylinder of the other half, a concrete center core cast inside each of the plurality of blocks of each of the halves and bolts embedded in the blocks and in the center core to form, for each half, a monolith of concrete with the blocks thereabout, and one end of at least one half having the concrete cut back to provide space for an annular central flange for the support of the pulpstone in the middle from a driving shaft, pipes in the concrete center cores and rods in the pipes for attachment to the annular central flange and to a driving shaft, whereby the two halves can be mounted upon said driving shaft and brought together, the surfaces of said blocks providing almost continuous abrasive material.

4. A long pulpstone in two halves of similar construction and the same diameter comprising, for each half, a concrete center core, metal hoops reinforcing said concrete core radially, metal pipes reinforcing said concrete core longitudinally, bonded abrasive blocks secured to the outside of the center core and forming a hollow cylinder of abrasive bolts embedded in said core and in said blocks uniting the blocks to the core, the concrete core being cut back at one end for the reception of center flanges, the pipes enabling long bars to pass through the concrete core for attaching the center flanges to end flanges, whereby the two halves can be mounted together, supported by the flanges where they join, with continuous abrasive blocks on the periphery of the pulpstone when the two halves are together.

5. A pulpstone and assembly therefor comprising a driving shaft, a pair of inner annular flanges adjacent each other, a pair of outer annular flanges remote from the inner flanges, one of said pairs of flanges being screw threaded on the inside with right hand and left hand threads respectively, cooperating right hand and left hand threads on the shaft in engagement with the right hand and left hand threads of the flanges, the other pair of flanges being in engagement with the shaft, a pulpstone comprising a plurality of blocks of bonded abrasive material arranged to form a hollow cylinder, a hollow concrete center inside of said cylinder and supporting it, bolts embedded in said blocks and in said center attaching said blocks to said center, a second plurality of blocks of bonded abrasive material similarly arranged, a second concrete center supporting said second plurality of blocks, bolts embedded in said second plurality of blocks and in said second center attaching said second plurality of blocks to said second center, said centers being dished out annularly to receive said inner flanges and said outer flanges being adjacent the outer ends of said centers, pipes embedded in said centers and extending parallel to the axis of said centers, and rods in said pipes secured to both the inner and the outer flanges, each rod extending from an outer flange to an inner flange adjacent to the center in which is the pipe through which the rod passes, whereby the pulpstone is in two parts which are independently driven by the shaft but which are pressed together by the reaction of the right and left hand screw threads in the flanges and on the shaft so that the two parts rotate as a unit.

HUGO W. H. BETH.

REFERENCES CITED

The following references are of record in the file of this patent:

UNITED STATES PATENTS

| Number | Name | Date |
|---|---|---|
| Re. 19,678 | Benner et al. | Aug. 27, 1935 |
| 2,054,771 | Larsson | Sept. 15, 1936 |
| 2,141,608 | Larsson | Dec. 27, 1938 |
| 2,177,550 | Patt | Oct. 24, 1939 |